US010584972B2

(12) United States Patent
Frish et al.

(10) Patent No.: US 10,584,972 B2
(45) Date of Patent: Mar. 10, 2020

(54) NAVIGATE, TRACK, AND POSITION MOBILE DEVICES IN GPS-DENIED OR GPS-INACCURATE AREAS WITH AUTOMATIC MAP GENERATION

(71) Applicant: ORIIENT NEW MEDIA LTD., Tel-Aviv (IL)

(72) Inventors: Amiram Frish, Giv'ataim (IL); Dror Reif, Be'er Ya'akov (IL); Michael Balter, Tel-Aviv (IL)

(73) Assignee: Oriient New Media Ltd., Tel-Aviv (IL)

( * ) Notice: Subject to any disclaimer, the term of this patent is extended or adjusted under 35 U.S.C. 154(b) by 115 days.

(21) Appl. No.: 15/757,656

(22) PCT Filed: Sep. 1, 2016

(86) PCT No.: PCT/IB2016/055233
§ 371 (c)(1),
(2) Date: Mar. 6, 2018

(87) PCT Pub. No.: WO2017/042672
PCT Pub. Date: Mar. 16, 2017

(65) Prior Publication Data
US 2018/0245927 A1  Aug. 30, 2018

Related U.S. Application Data

(60) Provisional application No. 62/216,575, filed on Sep. 10, 2015.

(51) Int. Cl.
G01C 21/00 (2006.01)
H04W 4/00 (2018.01)
(Continued)

(52) U.S. Cl.
CPC ........... *G01C 21/30* (2013.01); *G01C 21/165* (2013.01); *G01C 21/206* (2013.01); *G01C 21/32* (2013.01);
(Continued)

(58) Field of Classification Search
CPC ........ G01C 21/00; G01C 21/26; G01C 21/30; G01C 21/34; G01C 21/165; H04W 4/00; H04W 4/024; H04W 4/025
See application file for complete search history.

(56) References Cited

U.S. PATENT DOCUMENTS

2006/0267833 A1  11/2006 Langford et al.
2013/0332064 A1  12/2013 Funk et al.
(Continued)

FOREIGN PATENT DOCUMENTS

WO  2013188597 A2  12/2013
WO  2015121677 A1  8/2015

OTHER PUBLICATIONS

Communication pursuant to Rule 164(1) EPC and Supplemental Partial European Search Report from a foreign patent office—European Patent Office—in a counterpart foreign application—EP 16 84 3762—dated Aug. 20, 2018, 16 pages.

*Primary Examiner* — Yonel Beaulieu
(74) *Attorney, Agent, or Firm* — Roach Brown McCarthy & Gruber, P.C.; Kevin D. McCarthy

(57) ABSTRACT

A system and method for mapping, tracking, positioning, and navigating in GPS-denied or GPS-inaccurate areas features accurate and automatic generation and update of a pedestrian lane map based on crowd-sourcing unique path features (UPFs) in combination with associated path estimates from a plurality of mobile devices. Searching and matching newly generated UPFs and associated path estimates, to a pedestrian lane map with known UPFs and associated lanes (or lane estimates) provides simultaneous
(Continued)

localization and mapping (SLAM) of mobile devices in GPS-denied or GPS-inaccurate areas, including indoors, underground; dense urban streets with high buildings, natural canyons, and similar environments. UPFs are robust to noise and orientation invariant, enabling operation on low cost mobile device sensors and handling of real life human behavior. The innovative UPFs and pedestrian lane map enable route finding, generating guiding instructions, tracking, and analysis of pedestrian traffic.

33 Claims, 6 Drawing Sheets

(51) Int. Cl.
*G01S 19/00* (2010.01)
*G01C 21/30* (2006.01)
*G01C 21/16* (2006.01)
*G01C 21/20* (2006.01)
*G01C 21/32* (2006.01)
*H04W 4/024* (2018.01)
*G01S 19/49* (2010.01)
*H04W 4/02* (2018.01)

(52) U.S. Cl.
CPC ............ *G01S 19/49* (2013.01); *H04W 4/024* (2018.02); *H04W 4/025* (2013.01)

(56) References Cited

U.S. PATENT DOCUMENTS

| 2015/0204670 | A1 | 7/2015 | Morrison et al. |
| 2016/0195400 | A1 | 7/2016 | Young et al. |
| 2016/0198308 | A1* | 7/2016 | Marti .................... G01S 5/0252 455/456.1 |

* cited by examiner

NAVIGATE, TRACK, AND POSITION MOBILE DEVICES IN GPS-DENIED OR GPS-INACCURATE AREAS WITH AUTOMATIC MAP GENERATION

FIELD OF THE INVENTION

The present invention generally relates to mapping, and in particular, it concerns mapping and mobile devices.

BACKGROUND OF THE INVENTION

Personal mobile devices are currently being used to provide a variety of services. One service is navigation. Navigation outdoors can take advantage of a variety of inputs and sensors, for example GPS, Navigation in GPS-denied or GPS-inaccurate areas requires new methods and systems to navigate, track, and position mobile devices, for example, indoors, underground, dense urban streets with high buildings, natural canyons, and similar environments.

SUMMARY

According to the teachings of the present embodiment there is provided a method for mapping, including the steps of: receiving sensor data based on location and movement of a mobile device; generating, based on the sensor data, a path estimate and a location measurement vector, the path estimate including locations of the movement of the mobile device; and the location measurement vector including one or more measurements at each of the locations from the sensor data from each of the locations; generating, based on the sensor data, the path estimate, and the location measurement vector, one or more unique path features (UPFs) by performing an operation based on the path estimate and the location measurement vector.

According to the teachings of the present embodiment there is provided a system for mapping including: a processing system containing one or more processors, the processing system being configured to: receive sensor data based on location and movement of a mobile device; generate, based on the sensor data, a path estimate and a location measurement vector (LMV), the path estimate including locations of the movement of the mobile device; and the location measurement vector including one or more measurements at each of the locations from the sensor data from each of the locations; generate, based on the sensor data, the path estimate, and the location measurement vector, one or more unique path features (UPFs) by performing an operation based on the path, estimate and the location measurement vector.

In an optional embodiment, the path estimate includes one or more measurements selected from the group consisting of: location uncertainty of the path estimate; and global axis framework orientation estimate aligning the mobile device to a common axis framework used by one or more other mobile devices.

In another optional embodiment, the location measurement vector includes one or more measurements selected from the group consisting of:
(a) magnetic field measurements;
(b) calibrated magnetic field measurements;
(c) RSSI measurements from at least one or more of Wi-Fi, BLE, cellular base station, or other RF beacons;
(d) PL measurements from at least one or more of Wi-Fi BLE, cellular base station, or other RF beacons; and
(e) TDOA measurements from at least one or more Wi-Fi, BLE, cellular base station, or other RF beacons.

In another optional embodiment, the location measurement vector is a location measurement change vector wherein each group of one or more measurements in the location measurement change vector is based on a change from a first of the locations to another of the locations.

In another optional embodiment, generating the UPFs includes performing, an operation based on the location measurement vector and the location measurement change vector. In another optional embodiment, the operation is an orientation invariant function, independent of the orientation of the mobile device. In another optional embodiment, the operation is one or more techniques selected from the group consisting of:
(a) a dot product between the location measurement vector and measurement changes;
(b) autocorrelation;
(c) cross-correlation;
(d) a path integral over the path estimate;
(e) autocorrelation between the location measurement vector and measurement changes over the path estimate;
(f) a path integral of magnetic measurements over the location measurement vector;
(g) a path integral of magnetic measurements over path change estimation (velocity);
(h) a path integral of magnetic measurements over magnetic measurements changes;
(i) a function of RSSI (radio signal strength indicator);
(j) a function of RSSI (radio signal strength indicator) over the location measurement vector;
(k) a path integral of RSSI (radio signal strength indicator) measurements over RSSI measurement changes;
(l) a function of path loss over the location measurement vector;
(m) a path integral of PL (path loss) measurements over PL measurements changes:
(n) a function of TDOA (time difference of arrival) over the location measurement vector; and
(o) a path integral of TDOA over TDOA measurements changes.

In another optional embodiment, the locations are over a path length measure corresponding to distance between 3 and 15 meters of the movement of the mobile device.

In another optional embodiment, the method further includes the step of: calculating, based on the UPFs, one or more lanes along which the mobile device has moved.

In another optional embodiment, the method further includes calculating lane estimates and convergence weights for combining lane estimates derived from the estimates uncertainty measures.

In another optional embodiment, the method further includes determining junctions based on the lanes.

In another optional embodiment the method further includes generating a pedestrian lane map based on the lanes, the pedestrian lane map including UPFs and associated lanes.

In another optional embodiment, the pedestrian lane map further includes an additional layer of information associated with locations on the pedestrian lane map.

In another optional embodiment, the method further includes removing one or more of the lanes and/or junctions from the pedestrian lane map.

In another optional embodiment, the method further includes calculating one or more lane estimates based on the UPFs, and then calculating a convergence of the lane estimates into one or more lanes.

In another optional embodiment, a plurality of UPFs is respectively generated for a corresponding plurality of mobile devices. In another optional embodiment, a plurality of lanes is calculated based on correlating the plurality of UPFs. In another optional embodiment, a plurality of UPFs is crowd-sourced from a corresponding plurality of mobile devices.

In another optional embodiment, the method further includes generating a reverse path based on reversing the sensor data.

In another optional embodiment, the processing system is further configured to calculate, based on the UPFs, one or more lanes along which the mobile device has moved.

In another optional embodiment, the processing system is further configured to calculate one or more lane estimates based on the UPFs, and then calculate a convergence of the lane estimates into one or more lanes.

In another optional embodiment, the processing system is further configured to generate a pedestrian lane map based on the lanes.

According to the teachings of the present embodiment there is provided a method positioning, including the steps of receiving sensor data bawd on location and movement of a mobile device: generating, based on the sensor data, a path estimate and a location measurement vector (LMV), the path estimate including locations of the movement of the mobile device; and the location measurement vector including one or more measurements at each of the locations from the sensor data from each of the locations; generating, based on the sensor data, the path estimate, and the location measurement vector, one or more unique path features (UPFs) by performing an operation based on the path estimate and the location measurement vector: and comparing the generated UPFs to stored UPFs in a pedestrian lane map to determine matching UPFs.

According to the teachings of the present embodiment there is provided a system for positioning including: a processing system containing one or more processors, the processing system being configured to: receive sensor data based on location and movement of a mobile device: generate, based on the sensor data, a path estimate and a location measurement vector (LMV), the path estimate including locations of the movement of the mobile device; and the location measurement vector including one or more measurements at each of the locations from the sensor data from each of the locations; generate, based on the sensor data, the path estimate, and the location measurement vector, one or more unique path features (UPFs) by performing an operation based on the path estimate and the, location measurement vector; and compare the generated UPFs to stored UPFs in a pedestrian lane map to determine matching UPFs.

In another optional embodiment, the matching UPFs have associated pedestrian lanes, and further including the step of providing the pedestrian lane map to a map display.

In another optional embodiment, the method further includes the step on calculating, based on the sensor data and the lanes, a location on one of the lanes of the mobile device.

In another optional embodiment, the matching UPFs are used to improve subsequent generation of path estimates and location measurement vectors.

In another optional embodiment, the comparing is over a most recent 3 to 15 meters of the movement of the mobile device.

In another optional embodiment, the path estimate includes a location uncertainty measure of the path, estimate and further including deriving a search bound from the location uncertainty measure.

In another optional embodiment, the method further includes one or more functions selected from the group consisting of:
  (a) finding a route on the pedestrian lane map from a first location selected from the group consisting, of:
    (i) a current location of the mobile device; and
    (ii) a location on the pedestrian lane map, to a second location selected from the group consisting of:
    (iii) a location of a device other than the mobile device; and
    (iv) a location on the pedestrian lane map;
    and prepare features of the route for real-time tracking.
  (b) generating guiding instructions for navigation to a destination location based on the pedestrian lane map;
  (c) tracking the mobile device during navigation;
  (d) updating the pedestrian lane map based on user-supplied information;
  (e) analyzing the pedestrian lane map to generate analytics on pedestrian traffic behavior; and
  (f) analyzing combinations of the location of the mobile device and user actions.

In another optional embodiment, the path estimate includes one or more measurements selected from the group consisting of location uncertainty of the path estimate; and global axis framework orientation estimate aligning the mobile device to a common axis framework used by one or more other mobile devices.

According to the teachings of the present embodiment there is provided a non-transitory computer-readable storage medium having embedded thereon computer-readable code for mapping, the computer-readable code including program code for: receiving sensor data based on location and movement of a mobile device; generating, based on the sensor data, a path estimate and a location measurement vector, the path estimate including locations of the movement of the mobile device, and the location measurement vector including one or more measurements at each of the locations from the sensor data from each of the locations; generating, based on the sensor data, the path, estimate, and the location measurement vector, one or more unique path features (UPFs) by performing an operation based on the path estimate and the location measurement vector, According to the teachings of the present embodiment there is provided a non-transitory computer-readable storage medium having embedded thereon computer-readable code for positioning, the computer-readable code including program code for: receiving sensor data based on location and movement of a mobile device; generating, based on the sensor data, a path estimate and a location measurement vector (LMV), the path estimate including locations of the movement of the mobile device; and the location measurement vector including one or, more measurements at each of the locations from the sensor data from each of the locations; generating, based on the Sensor data, the path estimate, and the location measurement vector, one or more unique path features (UPFs) by performing an operation based on the path estimate and the location measurement vector: and comparing the generated UPFs to stored UPFs in a pedestrian lane map to determine matching UPFs.

According to the teachings of the present embodiment there is provided a computer program that can be loaded onto a server connected through a network to a client computer, so that the server running, the computer program constitutes a server in a system according to this current description.

According to the teachings of the present embodiment there is provided a computer program that can be loaded onto a computer connected through a network to a server, so that the computer running the computer program constitutes a mobile device in, a system according to this current description.

BRIEF DESCRIPTION OF FIGURES

The embodiment is herein described, by way of example only, with reference to the accompanying drawings, wherein.

ABBREVIATIONS AND DEFINITIONS

Figure 1:
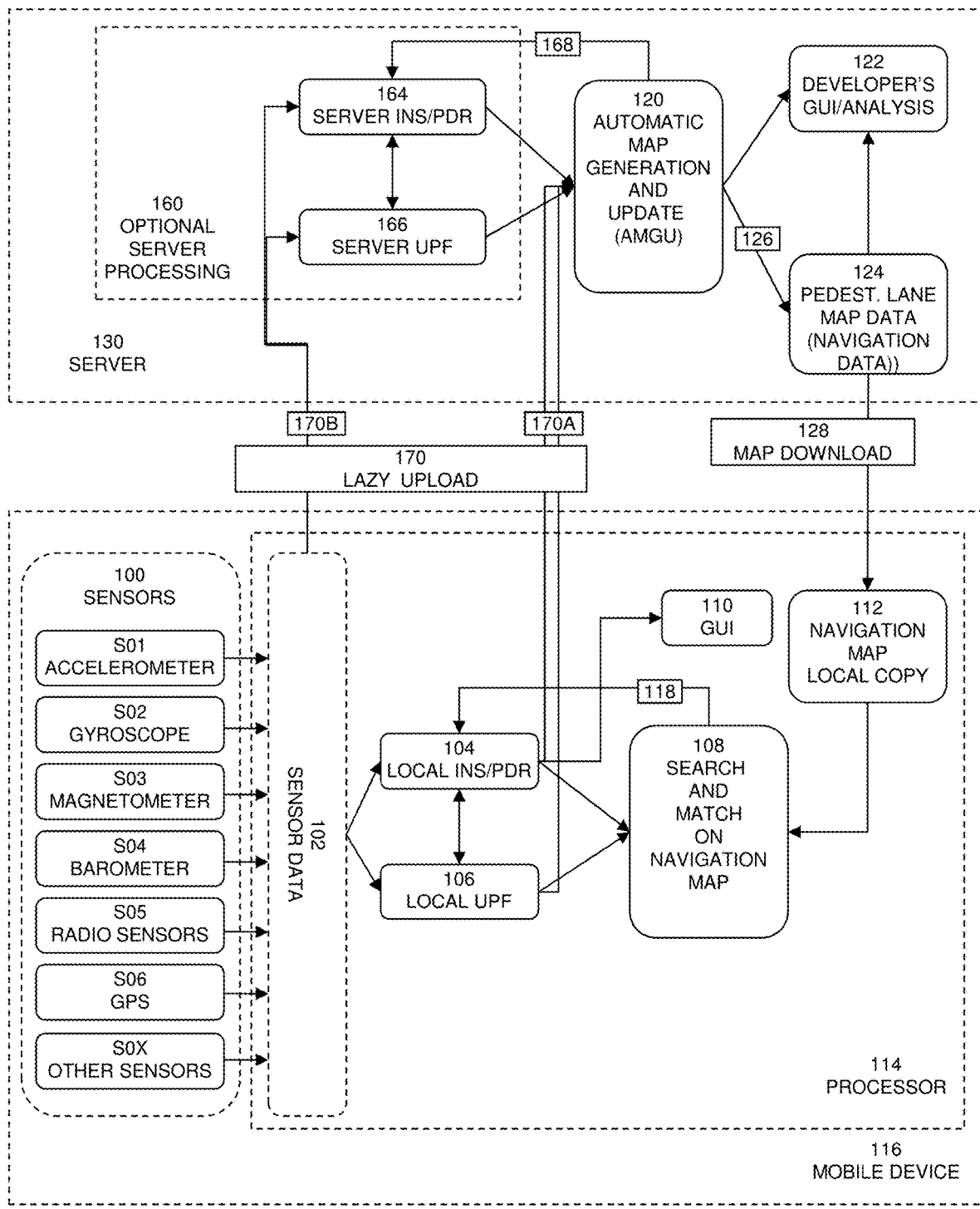
FIG. 1, a high-level diagram of a system for mapping, tracking, and navigating in GPS-denied or GPS-inaccurate areas.

For convenience of reference, this section contains a brief list of abbreviations, acronyms, and short definitions used in this document. This section should not be considered limiting. Fuller descriptions can be found below, and in the applicable Standards.

AMGU—Automatic Map Generation and Update.

BLE beacon—Bluetooth low energy beacon, a wireless device that periodically broadcasts a Bluetooth low energy packet.

Crowd-source obtaining information or input into a particular task or project by enlisting the services of a number of people or devices. The process of obtaining needed services, ideas, or content by soliciting contributions from a large group of people or devices.

INS—Inertial Navigation System.

Lane—In the context of this document, the term "lane" or "pedestrian lane" generally refers to a convergence of paths, in other words, the walking pattern created by people walking in an indoor environment (with mobile devices).

Lane estimate(s)—an estimation of a lane based on one or more path estimates, typically several path estimates in the vicinity of one another converge to a lane estimate.

Lazy download—Similar to a "lazy upload", but typically in the opposite direction, that is, from a server, or cloud to a mobile device.

Lazy upload—Uploading (sending or retrieving) data when a connection and bandwidth, are available, typically after a delay in time from when the data is collected/generated. A lazy upload is typically front a mobile device to a server for data that does not require uploading, or is not time sensitive, not real-time, and can be uploaded with a delay, possibly significantly later in time than when the data is available. A typical use is to upload data that was collected by a mobile phone during the day, while not using (avoiding use of) mobile data bandwidth during the day, instead using local Wi-Fi when the mobile phone returns home in the evening or overnight. Note that if a connection and sufficient bandwidth are available, then data that is normally communicated via a lazy upload can be communicated sooner, with less delay, or without delay, for example in real time, Line integral—an integral where the function to be integrated is evaluated along a curve. Also referred to in the art as a path integral, curve integral, curvilinear integral, and contour integral as well. The function to be integrated may be a scalar field or a vector field. The value of the line integral is the sum of values of the field at all points on the curve, weighted by some scalar function on the curve. This weighting distinguishes the line integral from simpler integrals defined on intervals.

LMV—Location measurement vector, a group of one or more measurements.

Map—In the context of this document, the term "map" generally refers to an innovative indoor pedestrian lane navigation map, also referred to as an indoor map, indoor area navigation map, navigation map, area navigation map, lane map, and pedestrian lane map.

Mobile device—Typically a modern smart-phone, generally a device that moves or can be moved, including one or more sensors providing data regarding location and movement of the device.

Mobile device path—A physical, real route of travel taken by a mobile device. A path travelled by a mobile device.

MRC—Maximal Ratio Combining.

Path—In the context of this document, the term "path" generally refers to a (real-world, physical) route of travel taken by a mobile device, and typically the corresponding person carrying the mobile device. Paths are represented by path estimates and UPFs, which are then combined to converge to a lane (pedestrian lane) representing the lane-like traffic patterns created by pedestrians.

Path estimate(s)—an initial determination based on sensor data of the location and movement of a mobile device. Typically represented by a vector of measurements at given times, for example a location measurement vector (LMV).

Path split—Initial identification of a possible junction.

PDR—Pedestrian Dead Reckoning,

PLM—Pedestrian lane map.

RSSI—Radio signal strength indicator,

PL—Path Loss.

QR—Quick response code.

SLAM—Simultaneous localization, and mapping.

TDOA—Time difference of arrival.

TOA—Time of arrival.

UPF—Unique Path Features.

DETAILED DESCRIPTION—FIRST EMBODIMENT—FIGS. 1 TO 8

The principles and operation of the system and method according to a present embodiment may be better understood with reference to the drawings and the accompanying description. A present invention is a system for mapping, tracking, positioning, and navigating in GPS-denied GPS-inaccurate areas. The system facilitates accurate and automatic generation of a pedestrian lane map (PLM) based on crowd-sourcing unique path features (UPI's) in combination with associated lanes from a plurality of mobile devices. An innovative feature of the current embodiment is searching and matching newly generated UPFs and associated path estimates, to a pedestrian lane map with known UPFs and associated lanes (or lane estimates). Simultaneous localization and mapping (SLAM) is performed when navigating to generate new, and update existing maps.

GPS-denied or GPS-inaccurate areas include indoors (inside buildings), underground, dense urban streets with high buildings, natural canyons, and similar environments. At a high-level, a typical, preferred embodiment of a system includes mobile devices with sensors, wireless communication medium, and in some embodiments also a server. A pedestrian lane map ("navigation map" or just "map" is automatically generated, updated, and used for the mobile devices real-time positioning and navigation. The mobile devices continuously take sensors measurements, as the mobile device is moving along a mobile device path. The measurements are sent to a processor (processing system) where path estimate is generated by Inertial Navigation System (INS) or Pedestrian Dead Reckoning (PDR) and unique path features (UPFs) are computed. The UPFs are robust to device orientation, sensors noise, drift, bias, and interference. One such important feature (UPF) is the path integral taken over the magnetic measurements, and several variations of this method are described below. Other features (UPFs) that can be used are based on known RF (radio frequency) estimates such as RSSI (radio signal strength indicator), PL (path loss), TDOA (time difference of arrival), and TOA (time of arrival). While these techniques are known for conventional location determination, the current embodiment uses these techniques in an innovative method to identify uniquely a path (not a location). A general approach introduces path vector measurements (fingerprints) autocorrelation, a function for unique path identification. The path estimate and the UPFs from multiple mobile devices (for example, crowd-sourced) are used to automatically generate and update the pedestrian lane map with paths, junctions, and lanes and the corresponding unique features (UPFs) over time. For this purpose, several paths-sections matching, merging, and optimizing as well as junction, lanes, and environment change identification methods are discussed below. A geo-fence can be added to the pedestrian lane map for the purpose of boundaries or walls visualization, thus creating a skeleton floor plan or pedestrian movement areas. The generated pedestrian lane map then provides a means to position and track a mobile device in real time, correct the device's INS/PDR path estimate, find a route from source location to destination location, generate guiding instructions for navigation, and allow users to mark and add information on the pedestrian lane map. While a preferred embodiment is described with regard to an indoor map, based on this description one skilled in the art will be able to implement generation and positioning for indoor, outdoor, and combination environments.

Referring now to the drawings, FIG. 1 is a high-level diagram of a system for mapping, tracking, and navigating in GPS-denied or GPS-inaccurate areas. A mobile device 116 includes sensors 100 and a processing system, such as exemplary processor 114. Sensors includes, but are not limited to an accelerometer S01, gyroscope S02, magnetometer S03, barometer S04, radio sensors S05, GPS S06, and other sensors S0X. The processor 114 can include one or more processors and/or co-processors, typically local to the mobile device 116. One or more of the sensors 100 generate sensor data 102 that is received by the processor 114. The sensor data is sent to a local INS/PDR module 104 and to a local UPF module 106. The local INS/PDR module 104 outputs generated data (including measurements and estimates) to the local UPF module 106, and to a GUI 110. The local INS/PDR module 104 can exchange data with the local UPF module 106. Both the local INS/PDR module 104 and the local UPF module 106 output measurements (measurement data) that are sent to both a search and match module 108, and optionally via "lazy upload" 170 (connection 170A) to server 130 to an automatic map generation and update (AMGU) module 120. Feedback for correction 118 is output from the search and match module 108 to the local INS/PDR module 104. The search and match module 108 uses a pedestrian lane map local copy 112 for processing (mapping, tracking, positioning, and navigation) on the mobile device 116. The AMGU module 120 outputs results such as lanes and associated UPFs to both a developer's GUI/analysis module 122 and to update 126 pedestrian lane map data 124 (navigation map data). The pedestrian lane map data 124 can be downloaded 128 by the server 130 or retrieved by the mobile device 116 as needed, desired, or required. Similar to a "lazy upload", the map download 128 can be a "lazy download". The downloaded pedestrian lane map data 124 can be stored on the mobile device 116 as a local copy 112 of the pedestrian lane map. The search and match module 108 then uses the updated pedestrian lane map local copy 112 for future processing. Not shown in the current figure is updating of the pedestrian lane map local copy 112 by the search and match module 108, nor other updates from the mobile device 116, the processor 114, or the search and match module 108 to the server 130.

Alternatively or in addition to the above-described processing, optional server processing 160 includes sensor data 102 being sent via lazy upload 170 (connection 170B) to server 130 to server INS/PDR 164 module and server UPF module 166. The server INS/PDR module 164 can exchange data with the server UPF module 166. Similar to the functioning of local INS/PDR module 104 and local UPF module 106 sending output measurements to a search and match module 108, the server INS/PDR 164 module and server UPF module 166 output measurements to the AMGU 120. Similar to feedback for correction 118 being output from the search and match module 108 to the local INS/PDR module 104, feedback 168 is output from the AMGU 120 to the server INS/PDR module 164. Based on the current description, one skilled in the art will realize the similar functions of the INS/PDR modules (104, 164), the UPF modules (106, 166), and the search and match module 108/AMGU module 120. For clarity, the current description will generally refer only to the local modules (local INS/PDR 104, local UPF 106, and search and match module 108) with the function of the server modules (server INS/PDR 164, server UPF 166, and AMGU 120) obvious to one skilled in the art. Similarly, generation and updating of pedestrian lane maps can occur with one or more local pedestrian lane maps on the mobile device 116, one or more global (master) pedestrian lane maps on the server 130, or both locally and globally in parallel or asynchronously depending on system parameters such as configuration, active communications, and available bandwidth. Differences between the local and server modules, in particular between the local search and match module 108 (that typically handles only local data) and the server AMGU 120 (that typically handles crowd-sourced data from a multitude of mobile devices), are described below as appropriate.

Alternatively, having local modules (local INS/PDR 104, local UPF 106, and search and match module 108) that are lower-powered, smaller, with lighter-weight implementations may be desirable as compared to the server modules (server INS/PDR 164, server UPF 166, and AMGU 120) that can take advantage of relatively greater power availability, computational power and higher system performance on the server 130 and/or cloud implementations.

In a case where connection(s) and sufficient bandwidth are available, then data that is normally communicated via the lazy upload 170 (connection 170A or connection 170B) or the lazy map download 128, can be communicated sooner, with less delay, or without delay, for example in real time. This configuration can implement all processing being done in the cloud (for example, all processing shown in the server 130) in real time (as opposed to using a lazy upload or download). For example, during navigation raw sensors measurements and/or sensor data 102 are sent to the cloud (server 130) and a location output is sent back from the cloud (server 130) to the mobile device 116 to assist locating the mobile device 116 (and associated user) on a pedestrian lane map.

The developer's GUI/analysis module 122 can be used for monitoring of the system, development of pedestrian lane maps, analysis, and for manually adjusting, adding and/or removing the automatically created lanes and junctions.

For clarity in the current description, a single mobile device 116 is associated with a user. This description is not limiting, and mobile devices can also be independent of a user. For example, one or more robots or drones each with one or more associated mobile devices could be sent into an unmapped building, or a building that has been damaged (for example as part of a rescue effort after an earthquake) to quickly generate a (pedestrian lane) map of available paths and learn the "ground truth" of what areas of the building are passable. It is foreseen that based on the current description additional sensors such as proximity sensors and radar could be added to a flying or sailing vessels in the air, on or under-water to generate a three-dimensional map of paths including the width of the path (cross-section perpendicular to the direction of travel).

A feature of the current embodiment is that typically simultaneous localization and mapping (SLAM) is performed. Both the mapping and positioning (navigation) methods perform similar functions. When navigating, generation of path estimates, location measurement vectors (LMVs), and UPFs can also be used for mapping, to generate new, and update existing pedestrian lane maps. SLAM can be performed locally on the mobile device 116, remotely (offline or in real-time) on server 130, or as a combination of processing and communications between components and modules of the local and remote devices. In a case where primarily magnetic measurements are used for location mapping, this technique can be thought of as "magnetic SLAM".

Figure 2:
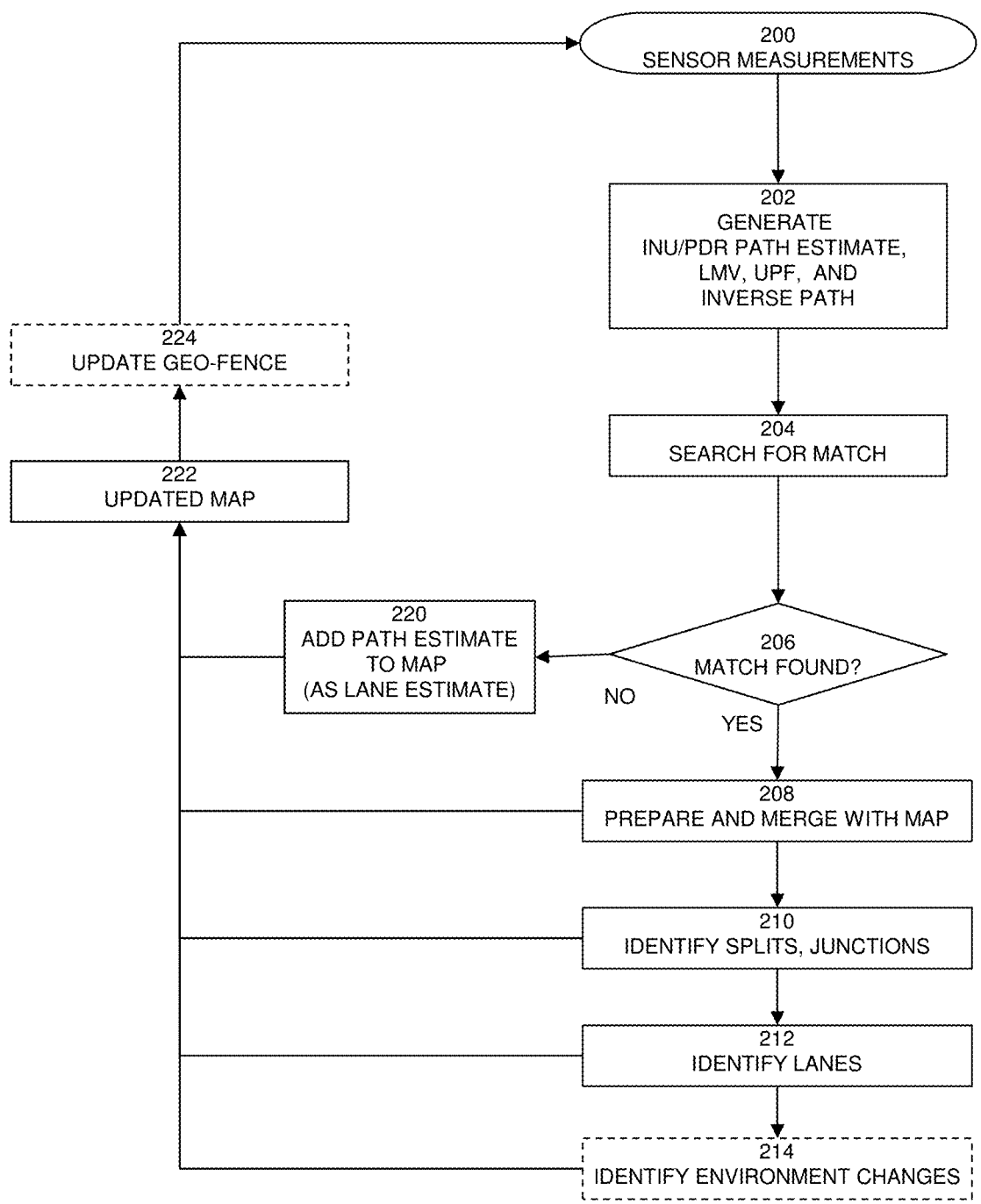
FIG. 2, a flowchart of a method for mapping (method for generating a pedestrian lane map).

Refer now to FIG. 2, a flowchart of a method for mapping (method for generating a pedestrian lane map). New sensor measurements 200 are sent from the sensors 100 as sensor data 102 and received by the processor 114. At least a subset of the sensor data 102 is used. All of the sensor data can be used, but may not be required, and not all of the sensor data has to be used. The mobile device 116 continuously takes sensor measurements along a mobile device path based on location and movement of the mobile device 116. The processor 114 can run one or more low complexity modules (not shown in the figures) to extract essential data from the ((raw, original, large amount of) sensor data 192. This essential data is sent for further processing in the local processor 114 or optionally and preferably (via lazy upload 170, connection 170B) to the server 130 for optional server processing 160. As is known in the art, the server 130 can be implemented by a variety of techniques, including but not limited to a single machine, cluster of two or more computers, and cloud-based (computing). The extracted essential data can be used to generate and update a (unique) pedestrian lane map. Typically, essential data from multiple devices, such as crowd-sourced data from a multitude of devices, is used to generate and update pedestrian lane maps. Alternatively or in addition, data from multiple uses (moving repeatedly over the same mobile device path) of one or a few devices can be used for processing. The processor 114 can also run one or more low complexity modules to position accurately the mobile device 116 on the most up-to-date local pedestrian lane map (area navigation map, discussed in more detail below). Note that a local pedestrian lane map can be received or retrieved by the mobile device 116 via the map download 128 as a lazy download or real time/on demand.

The sensor data is used to generate 202, a path estimate (path estimation, estimated path) and one or more unique path features (UPFs). Preferably, an inverse path is also generated. The local INS/PDR 104 typically also generates a location certainty (or the opposite, an uncertainty) measure and a global axis framework orientation estimate, which are used to align different mobile devices to the same axis framework. Preferably, the global axis framework orientation is independent of orientation of the mobile device 116. Outputs of the INS/PDR 104 are generally referred to in the context of this document as "INS/PDR estimates" or "INS/PDR outputs".

The local INS/PDR 104 generates a path estimate based on the sensor data. In the context of this document, a path estimate is an estimation of a series of locations, at defined moments in time, along the movement path of the mobile device. A path estimate generally has at least two locations, typically at least several locations, and possibly a multitude of locations over a time period of at least a few seconds or over a path length measure corresponding to at least 1 meter. A section of a path, or a path segment, is a partial cut from the multitude of location that maintains the locations order, for example all the locations between a path length corresponding to 3 to 15 meters, or 10 to 60 meters. A path estimate can also be thought of as a trajectory or trajectory estimate.

For each location (or alternatively for each time) in a path estimate, one or more, typically at least several, of the following exemplary estimates can be measured and/or calculated from the incoming sensor data 102: location, orientation/heading, magnetic field (typically calibrated magnetic field), and various RF estimates such as RSSI, TDOA, and TOA. Magnetic field measurements are typically measured by the mobile device 116 magnetometer S03. Calibrated magnetic field measurements can be generated by a calibration procedure performed to achieve a location measurements vector that is invariant to rotations, i.e. removing hard-iron and soft-iron effects from the measured magnetic field. Each group of one or more measurements (or estimates and calculated data) is known as a location measurement vector (LMV). Each estimate in the LMV may have a corresponding uncertainty/certainty measurement. For example, location and location uncertainty, orientation (which can be implemented in forms such as quaternion, rotation matrix, 2-direction vector in the global axis framework) and orientation uncertainty (to the global axis framework), and RSSI and RSSI uncertainty. Each type of estimate may have one or more values for each location, for example, an RSSI value from each of the received Wi-Fi hotspot signals in the area. One skilled in the art will realize that the above-described components of a path estimate may be combined into a single path estimate vector, or one or more values (for example location and orientation) can be handled as a separate location measurement vector (for example containing sensor data from physical phenomena). A typical implementation includes a path estimate including locations of the movement of the mobile device, and a location measurement vector including one or more measurements (or estimates) of one or more physical phenomenon at each location (in the path estimate). In other words, each LMV is associated with a different location and the locations corresponding to locations of the path estimate. The measured or estimated physical phenomenon is a static (or slowly varying) phenomenon that is similarly measured for a location by mobile devices. For example, consider calibrated magnetic field or RF estimates from multiple hotspots car Bluetooth low energy (BLE) beacons. The latter type of location measurement vector is also known in the literature as location fingerprint.

An optional additional implementation includes defining a location measurement vector change (LMVC) for each group of measurements as some measure of change between two LMVs a path taken by the mobile device. In this case, each measurement group does not include measurements at locations (points), but of the changes in measurements between two locations (two points in time). The selection of two points for a LMVC is not limited, nor is the measure of change. Typically, the two points are consecutive along the path, of the mobile device and the operation is a difference operation.

In the above discussion, the measurements and estimates are associated as a function of growing time. In other words, the listed estimates and measures are for each point in time. Alternatively, the listed estimates and measures can be for each of some ("x") estimated distance traveled, or for each of some other ("y") estimated magnetic distance traveled (where magnetic distance is an amount of some accumulated magnetic change measure). In the cases of estimated distance and estimated magnetic distance, an additional assumption can be made that if the distance does not grow (fails to increase) then the estimates do not update (remain stable). In a more general description, the listed estimates and measures can be for each of some other ("z") estimated LMV distance traveled (where LMV distance traveled is an amount of some accumulated LMV change measure, i.e. absolute value on LMVC). The accumulated estimated distance traveled (or estimated magnetic distance traveled or more generally estimated LMV distance traveled) corresponds to an actual amount of distance traveled in the real world and can be used as a path length measure.

The global axis framework orientation could be derived, for example, from a gravity estimate or a distance (or long time) smoothed magnetic estimate. Techniques are known in the art for generally generating a global axis framework orientation.

The location certainty measure (or the location uncertainty) is a quantity referring to how accurate (or inaccurate) a measured or determined location is, as compared to the true (real-world) location.

The local INS/PDR 104 preferably also generates an inverse path (or more technically, at this point in, the processing, an inverse path estimate). An inverse path can be thought of as the mobile device moving backwards from the end to the beginning of a real mobile device path. In other words, if the user had walked the same path in the opposite direction. The inverse path can be generated, for example, by reversing the time order of sensor measurements for a given path length, or window of time over a length of a path estimate. Using gathered sensor data for a path to calculate an inverse path provides, the system with additional data (for generating and updating pedestrian lane maps) without the need for a mobile device to actually collect data in two directions. Corresponding to an inverse path, an inverse path LMV and inverse LMVC can also be calculated.

The local UPF module 106 generates one or more UPFs based on the sensor data 102 and the INS/PDR estimates from the local INS/PDR module 104 (such as path estimates, LMVs, and LMVC). The newly generated UPFs are associated with corresponding INS/PDR estimates from the same locations. Generally, the UPF association specifically includes the path estimate. A Unique Path Feature (UPF) is an operation on location measurements (LMVs) and/or measurement changes (LMVCs) along the movement path of the mobile device. A UPF operation involves an operation on multiple measurements, typically all of the location measurements along a path (or section of a path/path section), for example an operation on a measurement vector or measurement change vector. A combination of UPF(s) and path estimates) uniquely identifies a path or a section of a path, in the indoor environment, hence the designator "UPF." The operation is preferably robust to mobile device orientation, sensor noise, drift, bias, and interference. The operation is preferably invariant to the mobile device 116 orientation or global axis framework, i.e. two mobile devices taking the same path will produce a similar UPF no matter how the mobile device 116 is held by a user or the device initial axis framework, for example the dot product between two measured or estimated vector fields.

Typically, the local UPF module 106 generates each UPF with a corresponding UPF certainty (or uncertainty), a quantity referring to how accurate (or inaccurate) a UPF is. The UPF uncertainty is derived from the measurements and estimates uncertainty on which the function generating the UPF is operating, and the operation.

Examples of operations for generating a UPF include:
Autocorrelation between the location measurement vectors and measurement changes over a path.
a path integral of magnetic measurements over the path change estimation (velocity),
a path integral of magnetic measurements over the magnetic measurements changes,
a path integral of RSSI (radio signal strength indicator) measurements over the RSSI measurement changes,
a path integral of PL, measurements over the PL measurements changes, and
a path integral of TDOA (time difference of arrival) over the TDOA measurements changes.

In the above examples of operations for generating a UPF, the dot product can be used as multiplication, and when talking about radio signals measurements (for example, RSSI, PL, TDOA etc.), each element in the measurement vector is a measurement associated with a single beacon, hotspot or cellular base station.

A family of UPFs over magnetic measurements is referred to as magnetic UPFs. A family of UPFs over the known RF estimates such as RSSI, PL, and TDOA are referred to as RF UPFs. A feature of the current embodiment is that conventional use of measurements such as TDOA are for identifying a location, in contrast to the innovative use in the current embodiment of using measurements to (uniquely) identifying a path (line or series of points instead of a single point). For example, conventional RF fingerprinting measures RSSI at multiple points to pair each RSSI measurement with a location. In contrast, a feature of the current embodiment is not (only) determining a location, but instead comparing a series of points to other series of points to determine a path (or a lane, as described in detail below). Unlike conventional measurements that focus on determining a static location based on sensor data (location fingerprinting), the current embodiment determines a UPF along a path length (a measure corresponding to the distance travelled by the censored mobile device). This may be thought of as "path fingerprinting", as opposed to conventional "location fingerprinting". An analogy can be made to hiking trails over a mountain: while each location on a trail has a certain height (fingerprint) the way the heights change over the trail (UPFs) creates a certain pattern or curve that uniquely identities the trail amongst the nearby possible trails.

As described above, when a connection to the server is available, the local INS/PDR module 104 outputs (including at least path estimates) and the local UPF module 106 newly generated UPFs are uploaded as data from the mobile device 116 (in general from multiple mobile devices/crowd-sourced as the lazy upload 170 via connection 170A). Preferably, a plurality of mobile devices 116 generates a plurality of respective UPFs for uploading. The uploaded data are then used by the AMGU module 120 (or the local data by the search and match module 108) to automatically generate and update one or more pedestrian lane maps with paths, junctions, and lanes, and associated unique features (UPFs).

The AMGU module 120 essentially does a search for a match 204 between newly generated UPFs from multiple devices (or locally the search and match module 108 from the single mobile device 116) and known UPFs associated with already identified lanes (or sections of lanes, or concatenation of sections of lanes that intersect). An innovative feature of the current embodiment is searching and matching newly generated UPFs and associated path estimates, to a pedestrian lane map with known UPFs and associated lanes (or lane estimates).

Depending on if a match is found 206, the method can, perform various processing. If a match is not found (fails to find a match) then the path estimate associated with the (not found) UPFs is added to a map 220 (added to a pedestrian lane map) as a new lane estimate. The new lane estimate is added with the associated UPFs for that lane estimate (from the path estimate). An updated map 222 (pedestrian lane map) is generated and available (for example as update 126 to pedestrian lane map data 124) for storage, distribution, downloading, and retrieving (for example via map download 128) by mobile devices. In a case where processing is being, done on the mobile device 116 by the search and match module 108, the updated map 222 is immediately available to the processor 114 in place of, or in addition to the navigation map local copy 112.

When a match is found 206 between newly generated UPFs and known UPFs, then respective path estimates and paths are also now known to match. The matched UPFs and associated path estimate are prepared and merged 208 to produce, an updated map 222. Preparing (in block 208) includes optimizing the data and/or other known functions such as cleaning, sifting, and normalization. The path length can also be adjusted and/or optimized for matching sections of a path. The path estimates from one or more mobile devices 116 (typically crowd-sourced from a multitude of mobile devices 116) can be merged and smoothed based on matched sections (sections of the path estimates). One skilled in the art will realize that preparing (such as pre-processing) of the sensor measurements and generated data can be done one or more times, possibly at multiple steps in the method.

Merging (in block 208) includes adding the newly generated UPFs and associated path estimate, to a pedestrian lane map with known UPFs and associated lanes (or lane estimates). This crowd-source technique converges to a unique navigation map (unique pedestrian lane map) where the paths that pedestrians take in an indoor environment are created with UPFs. Furthermore, this innovative technique models the way human walking behavior actually takes place in an indoor environment, simplifying way-finding significantly compared to conventional techniques.

A preferred implementation of a pedestrian lane map is essentially as a directed multigraph. A multigraph is a graph that allows multiple directed edges (arrows) between vertices. A vertex in a multigraph can be used to represent a "junction" of a pedestrian lane map, and one of the edges connecting two vertices in a multigraph can be used to represent a "lane" of a pedestrian lane map. Each (directed) lane is associated with a set of path estimates and associated UPFs ordered from the source junction to the destination junction. A junction is mainly associated with a location estimate (and optionally a small amount of other path estimates). A "path split" has a temporary nature, that is, the system has not decided yet if a path split is a real junction or maybe a few users changing the lanes the users are taking. Path splits that are supported by additional, data (path estimates and UPFs) continue to exist, can be verified, and eventually change status to being a junction.

Identifying splits and junctions 210 is typically done any time new data is added to a pedestrian lane map. For clarity, note that modules such as the prepare and merge 208 and the identify splits, and junctions 210 can update and have access to updated pedestrian lane maps (lines not shown on FIG. 2). Using at least a portion, typically all, of the pedestrian lane map data for a lane (or lane estimate) new splits are identified, a probability of being a junction is increased for existing splits, and when the probability exceeds a designated probability the status of the split is changed to being a junction. One technique for identifying path splits is to increase the matched section lengths of path, estimates being compared until the path estimates no longer match, i.e. either the UPFs or the INS/PDR path estimates start to differ strongly at the edges of matched sections. At a point where matches are lost/begin the points are first identified as path splits and added as vertices to the pedestrian lane map. If over time there are no additional splits in the vicinity of an original split, the vertex associated with the original split is discarded. If over time there are more splits in the vicinity of the original split then the split is recognized as a junction. The splits and junctions can be used to produce an updated map 222.

Identifying lanes 212 is also typically done any time new data is added to a pedestrian lane map. Similar to splits becoming junctions, path estimates are used to create lane estimates that may continue to exist, be verified, and eventually change status to being a "lane". A lane is a convergence of paths (represented by path estimates) from many different mobile devices. In simple terms, a lane can be thought of as the traffic pattern created where people walk with mobile devices. There can be more than one lane in a corridor (physical space where a mobile device moves).

A lane has associated UPFs. The convergence of paths to a lane typically corresponds to whether or not the UPFs of the paths match (this process may also determine the lane width). Lane estimates can be a correlation tunnel of paths matched using UPFs and/or path estimates in close vicinity to one another with small enough (less than a given amount of) location uncertainty. In other words, correlated UPFs within a range, or a fitting between UPFs, defines a boundary, a 3-dimensional (3D) tunnel (tunnel boundary). When two mobile devices travel within this tunnel boundary, each of the two mobile devices will produce UPFs that matches each other. Alternatively, or in addition to, if the location uncertainty of two path estimates is small enough (less than a given amount) and the two path estimates are in close proximity to one another (a geometric threshold) then the two path estimates might be considered as 'walking on the same lane'. Preferably, in a case where a plurality of mobile devices 116 generates a plurality of respective UPFs, a plurality of lanes can be calculated based on correlating the plurality of UPFs.

Lanes connect splits and/or junctions. As described above, lanes are essentially edges with source and destination junctions being the same and in close proximity to one another. This identification of lanes allows the real time tracking to know when a user switches lanes. Lanes are consolidated and updated into a pedestrian navigation map. The lanes can be used to produce and/or update a pedestrian lane map, as shown as the updated map 222.

Optionally, the method can identify environment changes 214, such as removing non-verified or obsolete lanes and junctions. When there are lanes and junctions in a pedestrian lane map that have not been matched (fail to match) for a given amount of time, the lanes and junctions can be discarded. The given amount of time can be configured, and may vary from one location on a pedestrian lane map to another location on the map, or from one map to another map. As the pedestrian lane map is adaptive, a change in the measurement (fingerprint) environment will result in new additional lanes and junctions with associated new and additional UPFs. As such, obsolete lanes and junctions can be removed. Another way to discard existing lanes and junctions is when people (and corresponding mobile devices) move in close proximity to the existing lanes and junctions, but fail to get a measurement matching on the existing lanes and junctions. These techniques can clean out the pedestrian lane map as time progresses, making the map simpler to store and simpler to navigate on, as compared to a map retaining data that does not correlate (uncorrelated) with current lanes. The environment changes can be used to produce an updated map 222.

Optionally, the method can update one or more geo-fences 224. After a pedestrian lane map is updated, for example with new lanes, a geo-fence can be created and/or updated based on the new lanes. Geo-fences around lanes depict pedestrian movement areas and traffic islands, making the pedestrian lane map more complete, intuitive, and user-friendly when displayed to a user.

A pedestrian lane map typically includes known UPFs and associated lanes (or lane estimates) as a basis of the map. Pedestrian lane maps can also include additional and optional data such as lane estimates, splits, paths, junctions, and associated navigation information (an information layer).

Figure 3:
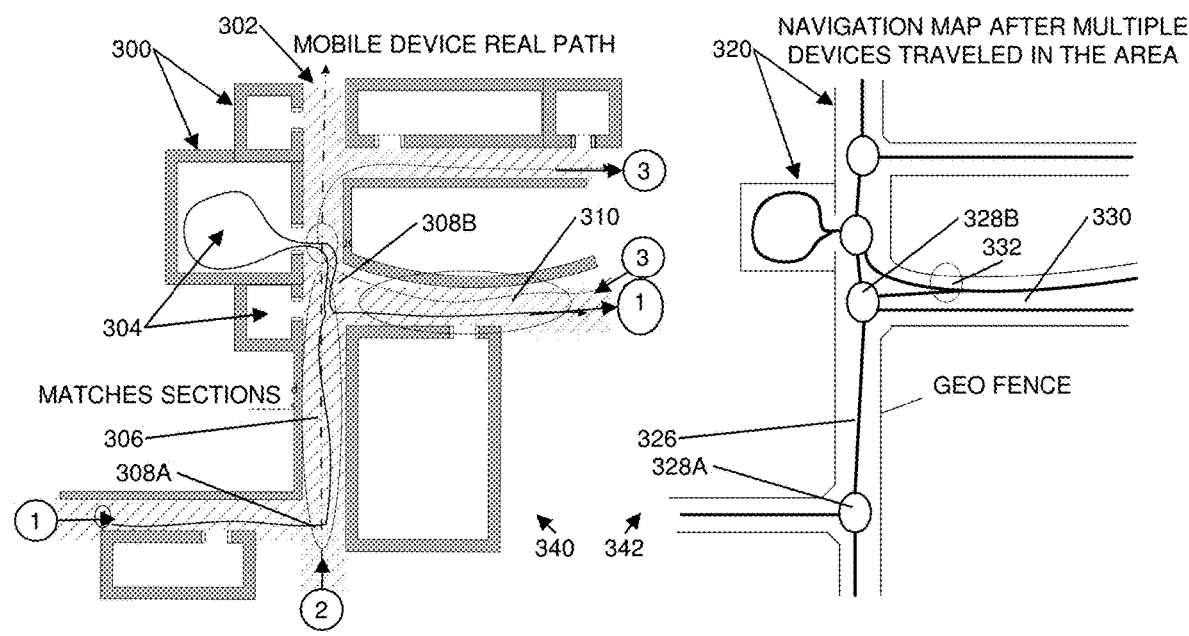
FIG. 3, a sketch of an AMGU example.

Refer now to FIG. 3, a sketch of an AMGU example. The left side of the current figure diagrams a real (real-world) building map 340 and mobile device paths (also known as "ground truth"). Walls 300, corridors 302, and rooms 304 are shown. Three exemplary paths (mobile device paths) are shown: user1 path (1), user2 path (2), and user3 path (3). Each exemplary path represents the movement of a user and the user's associated mobile device 116. At some points in the building 340, paths of users match, for example in a first section 306 both user1 path (1) and user2 path (2) travel the same corridor between a first intersection 308A and a second intersection 308B. At a second section 310, both user1 and user3 move with associated mobile devices along the same corridor, but in different locations (sides of the corridor, where the paths of user1 and user3 do not match/fail to match). Each of user1 path (1) and user3 path (3) is shown on a side of the corridor for the same second section 310.

The right side of the current figure is a visual representation of a pedestrian lane map 342. As the current example uses data from multiple mobile devices 116, generation of the pedestrian lane map 342 is typically performed by the AMGU 120 on the server 130. The pedestrian lane map 342 shows an exemplary lane 326, a first junction 328A, a second junction 328E, and a path split 332. As described in detail elsewhere in this document, sensor data 102 is collected from multiple mobile devices 116 as the mobile devices 116 move along a mobile device path (such as user1 path (1), user2 path (2), and user3 path (3)). Collected data and/or path estimates and UPFs are sent via lazy upload 170 (connection 170A or connection 170B) to the server 130. The AMGU module 120 does a search for a match 204 between newly received UPFs from multiple devices and known UPFs associated with already identified paths. For example, if exemplary lane 326 (and associated UPFs) is already known from previous processing of path estimates and UPFs from the user1 path (1), then when path estimates and UPFs are received from user2 [user2's mobile device 114 moving along user2 path (2)] user2's UPFs are compared to UPFs of the pedestrian lane map 342. In this case, a match is found for user2's UPFs for the first section 306. The data received from user2 (path estimates, UPFs, and optionally other data such as location certainty measure and global axis framework orientation estimate) is then used to identify and reinforce the mapping of lanes (exemplary lane 326 from first section 306), junctions (first junction 328A from first intersection 308A, and second junction 328B from second intersection 308B), and identify or reinforce splits (for example split 332) as possible junctions.

Note in pedestrian lane map 342 that second section 310 (from building map 340) has been processed to identify two lanes in the second corridor 330. One or more geo-fences 320 can be generated or updated to depict a skeleton of a floor plan around known lanes.

Figure 4:
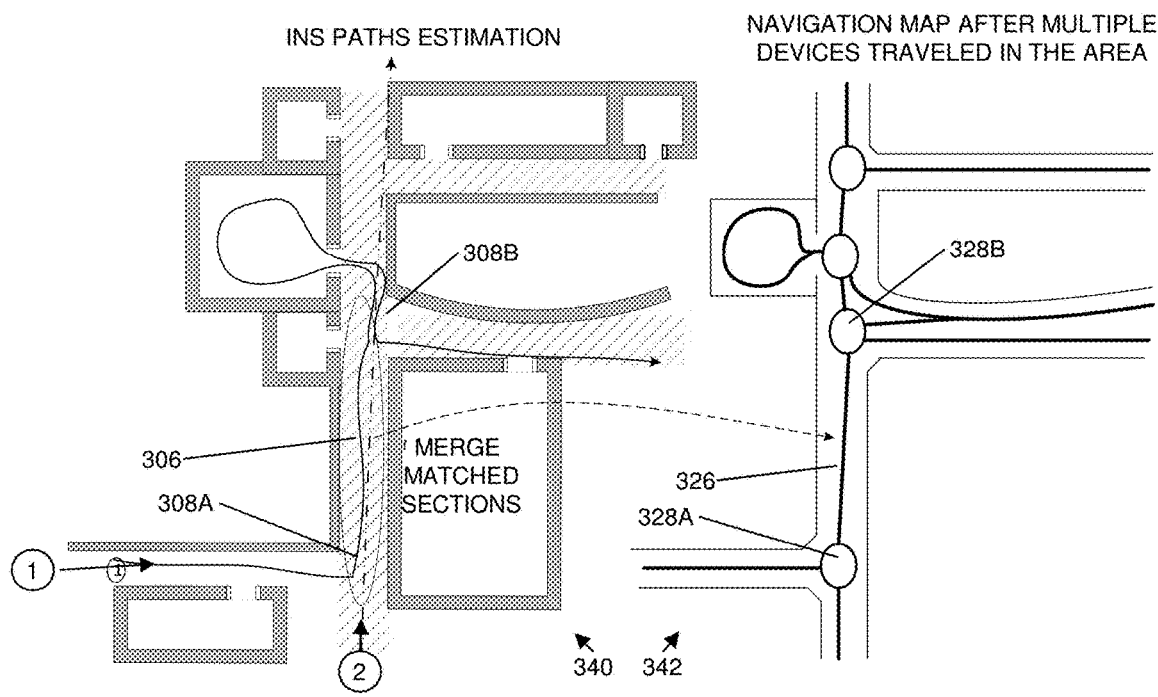
FIG. 4, a sketch of an AMGU map generation with drift of path estimates.

Refer now to FIG. 4, a sketch of an AMGU map generation with drift of path estimates. For simplicity in the following exemplary description, reasonable alignment to the global coordinate system (the global axis framework) is assumed for the mobiles devices involved. If the mobile devices are not yet aligned (unaligned) to the global axis framework, UPF matches can be found for the mobile devices to align one mobile coordinate system to another mobile coordinate system (for example, by gravity estimate, magnetic estimate, or other heading estimate). In the first section 306 both the user1 path (1) and the user2 path (2) travel the same corridor between the first intersection 308A and the second intersection 308B. However, the two paths do not (fail to) estimate the exact same path—there is a drift, or a discrepancy between the real-world mobile devices paths estimates and coordinate systems. The drift is an inherit property of the inertial sensors that results in generated data (path estimates) that is biased from the ground truth. When the AMGU 120 processes the data from each of the user1 and user2 mobile devices, the AMGU must decide if the data is sufficiently close (within a predefined or determined range) to merge the data into a common lane estimate or lane. If the ground truth of the mobiles is indeed close (as depicted in the building map 340), the measured UPFs will match, and the merging will average out the discrepancies in the path estimate (as the inertial measurement from, different devices are independent). All of the user data (from user1 and user2) can he stored in association with the identified exemplary lane 326 and used for future matching of user data to the pedestrian lane map 342.

Positioning and Navigation

The most up-to-date pedestrian lane map is maintained on the mobile device 11 as the navigation map local copy 112. This pedestrian lane map is typically downloaded from the server 130 navigation map data 124 via the map download 128 to the mobile device 116. The download can be via a lazy download when a connection is available, or requested by the mobile device in real-time when a navigation function (real-time positioning on the pedestrian lane map) is activated. In a case where a connection between the mobile device 116 and the server 130 is not available (unavailable), the mobile device can maintain and update the navigation map local copy 112.

When positioning and navigating, the functions of generating UPFs and comparing the generated UPFs to stored UPFs are normally performed by the same processor 114 in the mobile device. However, one skilled in the art will realize that a variety of implementations are possible, including the mobile device 116 processor 114 initiating one or more steps of the methods to be performed by other local or remote processors or devices. For example, the sensor data 102 and/or the UPFs can be sent in real time (via connection 170A and or connection 170B) to server 130 for real-time processing and returning from the server 130 to the mobile device 116 pedestrian lane map, lanes, and/or location of the mobile device 116 (on one of the matching lanes).

Figure 7:
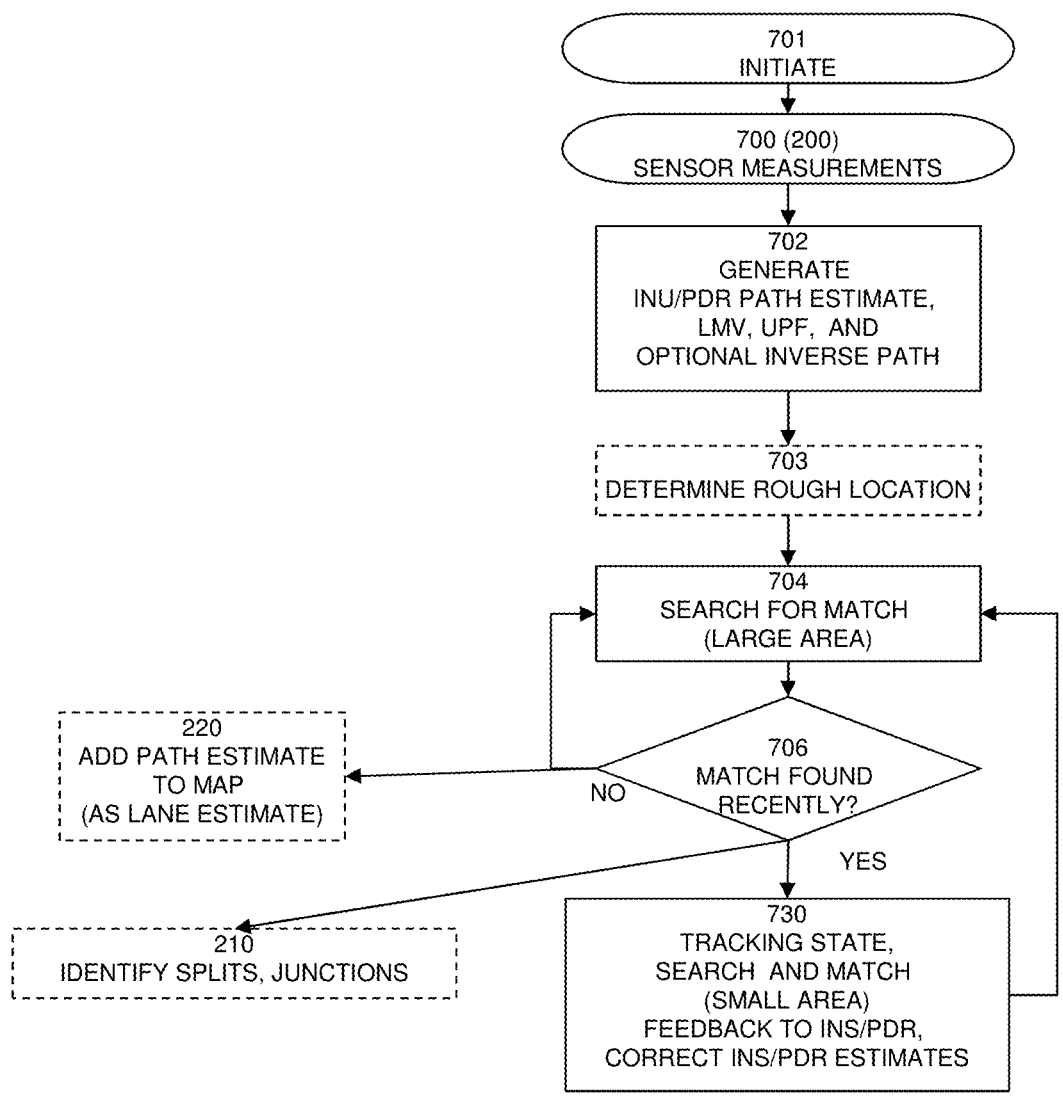
FIG. 7, a flowchart of a method for positioning (method for positioning and navigating using a pedestrian lane map).

Refer now to FIG. 7, a flowchart of a method for positioning (method for positioning and navigating using a pedestrian lane map), and also refer again to FIG. 1 and FIG. 2. When navigation is initiated 701, a method tier positioning uses steps similar to the method for mapping.

A method for positioning starts similar to the method, for generating a map (mapping), by receiving 700 sensor data 102 based on location and movement of a mobile device 116. The receiving 700 of sensor measurements for positioning is substantially the same as receiving new sensor measurements 200 when mapping. Based on at least a subset of the sensor data 102, the local INS/PDR module 104 generates 702 a path estimate and a location measurement vector (LMV). The path estimate includes locations of the movement of the, mobile device. The location measurement vector includes one or more measurements at each of the locations from the sensor data 102 from each of the locations. Based on the sensor data 102, the path estimate, and the LMV, one or more unique path features (UPFs) are generated by the local UPF module 106 by performing an operation based on the path estimate and the location measurement vector.

A feature of the current embodiment is that typically simultaneous localization and mapping (SLAM) is performed. Comparing mapping block 202 and navigating block 702, both perform similar functions. When navigating, generation of path estimates, LMVs, and UPFs for navigating can also be used to generate new, and update existing pedestrian lane maps. One skilled in the field will see the connections and crossovers between the methods of mapping and positioning (navigating). For example, when navigating block 702 can optionally generate an inverse path (similar to typical functioning of mapping block 202) for use in mapping during navigation.

Optionally, determining 703 an initial rough location of the mobile device 116 to determine which sections on the pedestrian lane map are in the vicinity of the mobile device 116 can be done based on BLE beacons, Wi-Fi hotspots location data, inaccurate GPS readings and inaccurate INS/PDR estimates. A rough location estimate can also be given manually by human operation or by other external system such as camera barcode/QR, scanning of known location tags. After an initial rough location is determined, the positioning method can be used to refine the location.

A search for match is performed in block 704, where the search and match module 108 performs a function similar to the AMGU module 120 including comparing the generated UPFs to stored UPFs in a pedestrian lane map (navigation, map local copy 112) to determine matching UPFs. If (fails to find match) a match is not found 706, the method loops to block 704 and continues searching for a match between the generated measurements and the pedestrian lane map. Optionally, and typically, the non-matched outputs can be added to a map 220 (added to a pedestrian lane map) as a new lane estimate (and additional mapping functions continued as appropriate for SLAM).

The output of the search and match module 108 can be used as feedback for correction 118 to the local INS/PDR module 104. Feedback can include the generated UPFs, matched UPFs, matched location on one of the lanes, matched location map orientation/heading data and associated uncertainty measures. Feedback can be used to improve subsequent generation of path estimates, heading, and orientation. The local INS/PDR module 104 can use the feedback for correction estimates and then output to the GUI 110 a location for presentation to a user of the mobile device 116. When a match is found 706, the method typically enters a tracking state 730, or tracking mode. In this state, the location uncertainty is typically lower than the location uncertainty of a non-tracking state.

Typically, the location uncertainty measure determines a search area, i.e. on which areas on the pedestrian lane map to search for a match. The uncertainty increases when no match is found, and decreases when a match is found. The tracking/non-tracking states can then be interpreted as significant decrease/increase in the location uncertainty measure.

In the tracking state 730 feedback to the INS/PDR module and correction of INS/PDR estimates continues, as well as searching and matching, but typically on a smaller search area. When a match is not found (fails to find match) recent tracking is lost, i.e. the generated UPFs and sensor data no longer indicate a match oh the pedestrian lane map for a nominal amount of time or distance, and/or the location uncertainty exceeds a defined amount and the method loops back to search for a match 704 on a larger area.

If a pedestrian lane map includes geo-fencing, the geo-fence(s) can further improve real time location estimation by constraining the estimate not to cross a geo-fence (stay within the bounds of a geo-fence).

Map data within the vicinity of the mobile device 116 can also be displayed, for example, to the GUI 100 on the mobile device 116 (connection not shown in figure).

Optionally, and typically, the matched outputs can be sent for identifying splits and junctions 210 (and additional mapping functions continued as appropriate for SLAM).

Positioning, navigation, and tracking can include identifying when the mobile device 116 switches lanes, crosses junctions, stops, and lingers.

Optionally and additionally, the current device location can be used to find a route on the pedestrian lane map from the current device location, or other source location input, to another device location, or another destination location input and prepare the route's features for real time tracking.

A route can be used in conjunction with one or more pedestrian lane maps to generate guiding instructions for navigation to a destination location based on the pedestrian lane map and the tracking of the mobile device 116 on the pedestrian lane map. For example, turn right in 5 meters, backup 10 meters etc.

Optionally, users or other systems can mark and add information to the pedestrian lane map, for example, locations of merchandise or items, advertisements, an information sign, etc.

Figure 5:
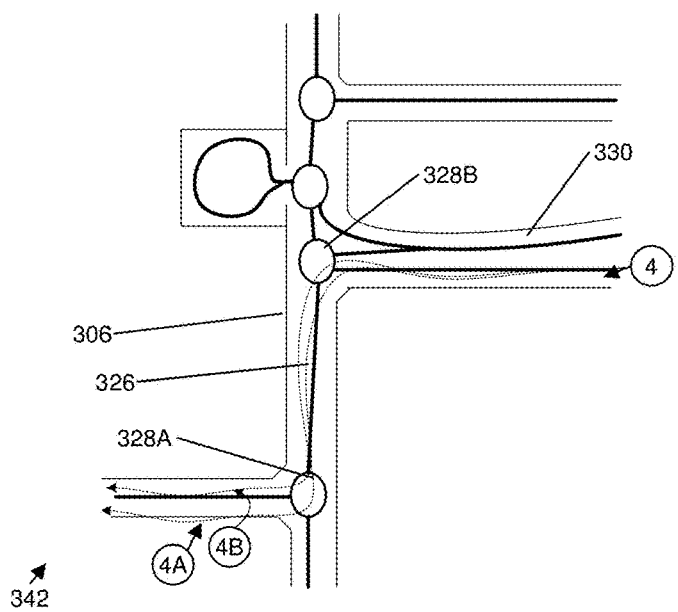
FIG. 5, a sketch of real-time navigation with path estimation correction.

Refer now to FIG. 5, a sketch of real-time navigation with path estimation correction. A visual representation of a pedestrian lane map 342 includes an overlay of user4 path (4) (dashed line) moving along the second corridor 330, turning left at the first junction 328A into first section 306 until the second junction 328B, turning right. The user4 path estimate (4A) varies from exemplary lane 326. In the current figure, one dashed line shows the user4 path estimate (4A) without correction feedback from the search and match module. However, since the user actually travels on the exemplary lane 326, the user's calculated LPFs matches the UPFs in the local pedestrian lane map enabling a correction feedback from the search and match module 108. A second dashed line (4B) in the current figure shows the correction of the user4 path estimate (4B) after this feedback from the search and match module.

The innovative UPFs and pedestrian lane map enable functions such as route finding, generating guiding instructions, tracking, and analysis of pedestrian traffic. Finding a route on the pedestrian lane, map from a first location (such as a current location of the mobile device and a location on the pedestrian lane map) to a second location (such as a location of a device other than the mobile device and a location on the pedestrian lane map) can be used to prepare features of the route for real-time tracking. Generating guiding instructions for navigation to a destination location can be done based on the pedestrian lane map. For example, instructions such as "turn right in 5 meters, backup 10 meters etc." The mobile device can be tracked during navigation. The pedestrian lane map can be updated based on user-supplied information. For example, users can add locations of stores, information signs, or adding advertisements. The pedestrian lane map and/or combinations of the location of the mobile device and user actions can be analyzed to generate analytics on pedestrian traffic behavior. For example, linger times/locations, busy hours, heatmaps—where people spent most time, and congestions. Another example, a user in a certain aisle of a certain store opening a browser to search for a certain product.

A Detailed Implementation

Note that in the mathematical description below, continuous time notation is used. Based on this description, one skilled in the art will be able to convert to other domains (for example to a digital sampling domain).

The local INS/PDR module 104 outputs, a path estimate γ(1) and (optionally) $m^B(t)$ magnetic measurements that can be fused with the gyroscope S02 data to have an orientation-independent axis framework (i.e. gyro rotates magnetic measurement to some initial body axis framework). An objective is to have the path estimate in the global axis framework orientation, but it is understood that without sonic initial GPS location or other means of side information this estimate may be highly inaccurate. Furthermore, generally INS/PDR suffers from an inherent drift due to general implementations using low cost sensors. For at least these reasons (see also below), location accuracy is also preferably estimated $\sigma_\gamma(t)$ and assumed to grow over time without location correction. The inputs to the local INS/PDR module 104 include sensor data 102 from sensors 100 such as accelerometer S01, gyroscope S02, magnetometer S03, barometer S04/altimeter, and GPS receiver S06. INS/PDR algorithms are known in the art, for example see *Pedestrian dead reckoning for MARG navigation using a smartphone*, by Z Tian, Y Zhang, M Zhou, and Y Liu, EURASIP Journal on Advances in Signal Processing 2014 (1), 1-9.

The inputs to the local UPF module 106 include γ(t) from the local INS/PDR module 104 and m(t)—the raw magnetic measurement signals of some in-building paths from the smartphone magnetometer (and optionally $m^B(t)$)

The local UPF module 106 can calculate a unique path function:

$$F(\gamma) = \int_C m(\gamma) \cdot d\gamma = \int_{t_0}^{t} m(\gamma(\tau)) \cdot \dot{\gamma} d\tau = F(t),$$

which is the integral path and $\gamma(t) = \bar{\gamma}(t)$ or $\dot{m}(t)$ i.e. the path can he the path estimate or the time derivative on the magnetic measurement. However, instead of time parameterization of the path, path length parameterization will be used here:

$$l(t) = \int_C |d\gamma| = \int_{t_0}^{t} |\dot{\gamma}(\tau)| d\tau.$$

$$F(\gamma) = \int_C m(\gamma) \cdot d\gamma = \int_{t_0}^{l} m(\gamma(\lambda)) \cdot \gamma'(\lambda) d\lambda = F(l)$$

And $\gamma(l) = \tilde{\gamma}(l)$ or $m'(l)$

Note that the notation is simplified by writing g(l)=g(γ(l))

The path length is calculated from the path estimate of the local INS/PDR module 104, i.e.

$$l(t) = \int_C |d\tilde{\gamma}|$$

and also used to find a matching window size in the below description.

Examples of other path functions, to generate other distinctive path features, include:

$$F(l) = \int_{t_0}^{l} m(\lambda) \cdot m'(l - \lambda) d\lambda$$

$$F(l) = \int_{t_0}^{l} m(\lambda) \cdot m(l - \lambda) d\lambda$$

$$F(l) = \int_{t_0}^{l} m'(\lambda) \cdot m'(l - \lambda) d\lambda$$

and similar, each functions having physical world pros and cons.

Describing the more general case of such path functions is:

$$F(\gamma) = \int_C f_1(\gamma) \cdot df_2(\gamma) = \int_{t_0}^{l} f_1(\lambda) \cdot f_2'(\lambda) d\lambda = F(l)$$

-continued $$F_{Fr}(l, r) = \int_{l_0}^{l} f_1(\lambda) \cdot f_2'(\lambda - r) d\lambda$$

$$F_{Bk}(l, r) = \int_{l_0}^{l} f_1(\lambda) \cdot f_2'(r - \lambda) d\lambda$$

Where $f_{1,2}(f)$ are fingerprint (measurement) vectors of measurement with corresponding size at a specific location. In communication system terminology, this is basically generating the autocorrelation of the path of vector measurements along a path. A variant of this is taking a cyclic autocorrelation of a path length L in order to limit the location measurements into path sections.

As an alternative for the path length, the measurement path length $$l(t) = \int_C |df_2(\gamma)|$$

can be used, however this may more prone to location measurements noise.

It RF fingerprinting is also available, (i.e. there are APIs to access RF measurements and sufficient in is recognized) more path functions can be generated following the generalization. For example, $f_1 = f_2 = f = [f_0, f_1, f_2, \ldots, f_{M-1}]^T$ is an RF measurements vector where each element is associated with a fixed infrastructure point, i.e., cellular cell id or Wi-Fi hotspot MAC ID, and the elements are measurements such as RSSI path loss (PL), and TDOA.

Finally, the UPFs can be high pass filtered to remove the long-term average.

An alternative approach to calculating the UPF can be to directly take the dot product $F_{Fr}(l,r) = f_1(l) \cdot {}_2^1(l-r)$ as the UPF and construct the integral and DC removal as part of the AMGU search and match procedures.

Given a path length window size to match, L, and the matching resolution $l_{res}$, denote the vector of sampled UPFs with $F_1 = [F(l), F(l-l_{res}), F(l-2l_{res}), \ldots, F(l-L)]^T$.

Let $\sigma_l$ be the corresponding location uncertainty.

Take only $F_{Fr}(l,0) = F(l)$ for simplicity.

Assume a new user UPF data $F_1^{new}$ and a single path in the pedestrian lane map (again for simplicity) an error function is constructed $$e_L(l, r) = \frac{\|F_l^{new} - F_r^{map}\|}{\|F_l^{new}\| + \|F_r^{map}\|}$$

Where the norm is some p-norm if considering the auto-correlation for the UPFs or $L^p$-norm when considering only the dot product as UPF.

Alternatively, one can use the correlation coefficient to construct the error function as follows $$e_L(l, r) = \frac{\|\langle F_l^{new}, F_r^{map}\rangle\|}{\|F_l^{new}\| \cdot \|F_r^{map}\|},$$

With inner product in 2-norm vector space or $L^2$ space.

Note: In a typical implementation, the actual pedestrian lane map is a directed multigraph so there are actually several options of building $F_r^{map}$ for each location in the pedestrian lane, map (referred to by r). When this is the case, the minimal value $e_k(l, r)$ can he taken over the options.

Further, assume that $F_r^{map}$ was search limited to within reasonable search bounds of the location uncertainty, i.e. $\{r: |\tilde{\gamma}_l - \tilde{\gamma}_l| < \sigma_r + \sigma_l\}$ for each l, to limit the search, complexity and matching ambiguity.

Now the problem can be thought of as: what is the best fit of the new UPF data on the pedestrian lane map UPF data:

$$\hat{e}_L(l) = \min_r \{e_L(l, r)\}$$

$$\hat{r}(l) = \operatorname*{argmin}_r \{e_L(l, r)\}$$

A decision device (with thresholds) can be derived since when there is a long path match $$\hat{e}_L(l) \xrightarrow[L \to \infty]{} 0$$

and when $$\text{not } \hat{e}_L(l) \xrightarrow[L \to \infty]{} 1.$$

After a match has been found, the match is optimized $$\hat{e}(l) = \min_{L_{min} \leq L \leq L_{max}} \{\hat{e}_L(l)\}$$

Where $L_{min}$ and $L_{max}$ are predefined parameters.

Further optimization can be made to minimize the error by taking fractional sample interpolation.

Now both the new UPFs and the INS/PDR estimates are merged with the pedestrian lane map structure. In this example the Maximal Ratio Combining (MRC) is used for merging the location estimates.

$$\sigma_{new}^2(l) \leq \sigma_{new}^2(l) + \sigma_{new}^2(l)$$

$$\gamma_{map}(\hat{r}(l)) \leq \frac{\frac{l}{\sigma_{map}^2(\hat{r}(l))}\gamma_{map}(\hat{r}(l)) + \frac{l}{\sigma_{new}^2(l)}\gamma_{new}(l)}{\frac{l}{\sigma_{map}^2(\hat{r}(l))} + \frac{l}{\sigma_{new}^2(l)}}$$

$$\sigma_{map}^2(\hat{r}(l)) \leq \frac{1}{\frac{l}{\sigma_{map}^2(\hat{r}(l))} + \frac{l}{\sigma_{new}^2(l)}}$$

$\sigma_{new}^2(l)$ is the uncertainty measure of the new location. $\sigma_{map}^2(\hat{r}(l))$ is the uncertainty measure of the matching map location and $\sigma_e^2(\hat{e}(l))$ is an uncertainty function of the error measure of the match (and is added because the match introduces some additional uncertainty regarding the exact location.

Figure 6:
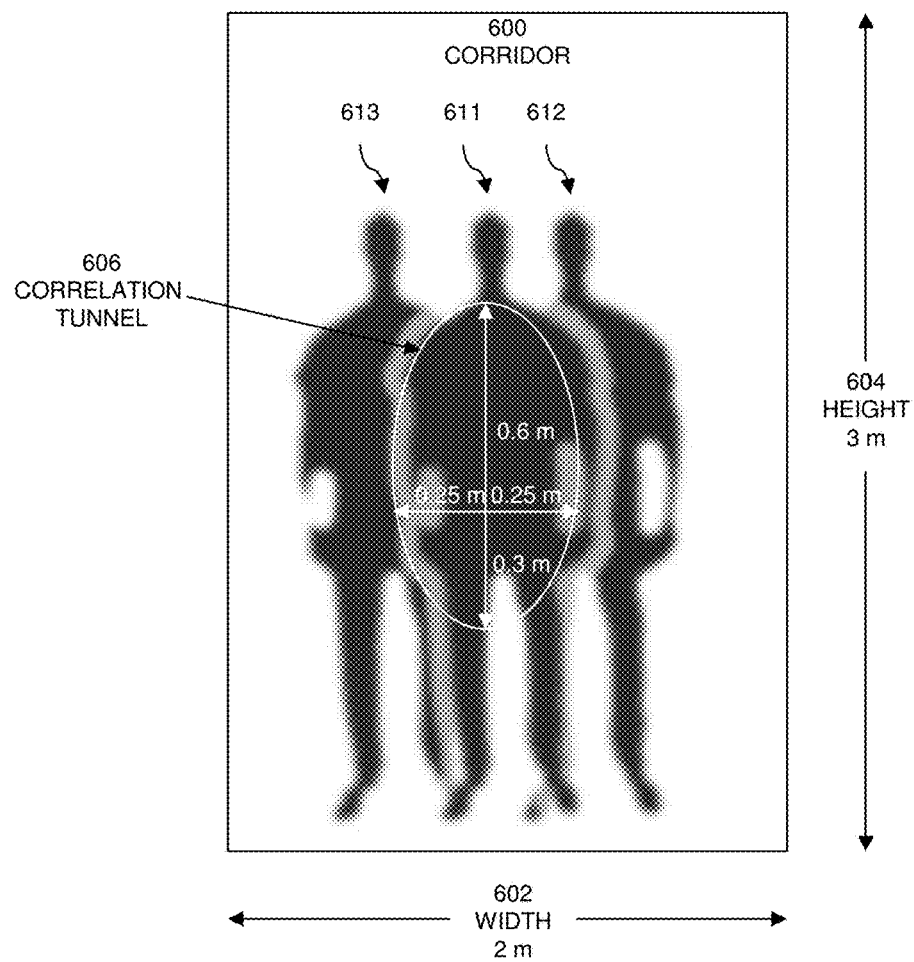
FIG. 6 a sketch of a correlation tunnel in a typical office space.

Refer now to FIG. 6 a sketch of a correlation tunnel in a typical office space. As noted elsewhere in this description, lane estimates can be a correlation tunnel of paths matched using UPFs and/or path estimates in close vicinity to one another with small enough (less than, a given amount of) location uncertainty. A typical office corridor 600 may have a width 602 of 2 meters (2 m) and a height 604 of 3 meters (3 m). A correlation tunnel 606 can be formed by the movement of one or more users (corresponding to the user(s)' associated mobile device(s) 116) in differing positions in the corridor 600, such as the middle of the corridor 611, left of middle 612 or right of middle 613. In this case, the exemplary correlation tunnel is 0.9 m in height and 0.5 m in width, centered on the calculated path. The correlation tunnel may represent different positions of users as the users travel through the corridor and/or the different positions of the user's associated mobile device 116. For example, the user's mobile device 116 may be lower on the user (worn on the hip, held in hand), in the middle of the user (in a shirt or jacket breast pocket), or higher on the user (near the head while talking on the phone). For the depicted correlation tunnel 606, for example, $\sigma^2$, should not exceed 0.25 meters). For the UPF merging an averaging function can be used with a forgetting factor so the pedestrian lane map has a forgetting factor and can adapt to environmental changes.

$$F_{map}(\hat{r}(l)) <= (1-\alpha)F_{map}(\hat{r}(l)) + \alpha(1-\hat{e}(l))F_{new}(l)$$

$$0 \le \alpha < 1$$

Non-matched locations are added to the pedestrian lane map as additional edges

Figure 8:
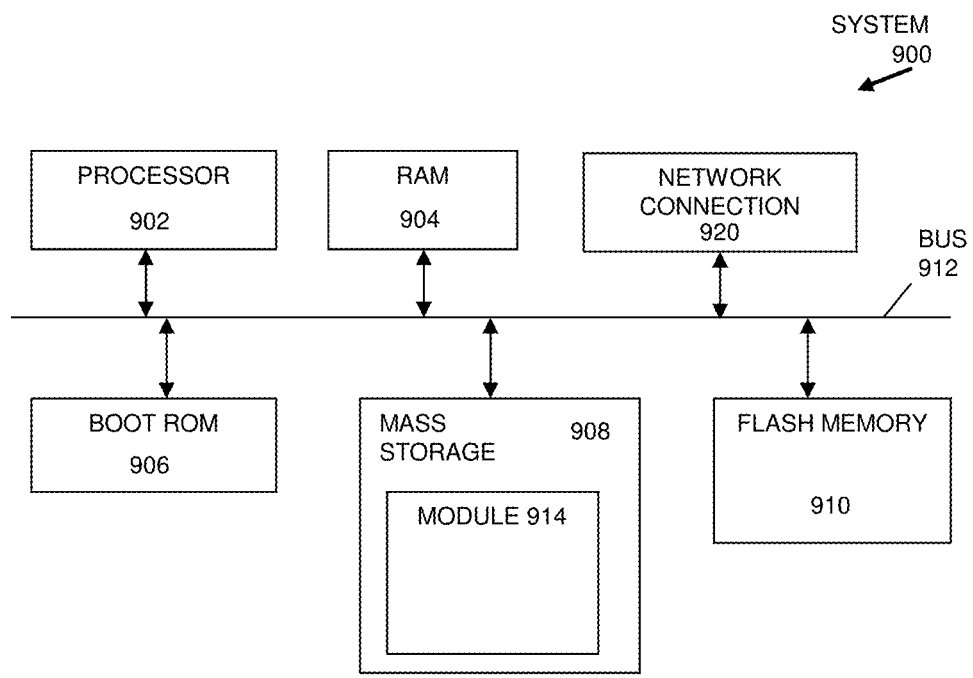
FIG. 8 is a high-level partial block diagram of an exemplary system configured to implement the system of the present invention.

FIG. 8 is a high-level partial block diagram of an exemplary system 900 configured to implement the system of the present invention. The system 900 can be used to implement one or more components and/or modules such as the processor 114, server 130, and optional server processing 160. System (processing system) 900 includes a processor 902 (one or more) and four exemplary memory devices: a RAM 904, a boot ROM 906, a mass storage device (hard disk) 908, and a flash memory 910, all communicating via, a common bus 912. As is known in the art, processing and memory can include any computer readable medium storing software and/or firmware and/or any hardware element(s) including but not limited to field programmable logic array (FPGA) element(s), hard-wired logic element(s), field programmable gate array (FPGA) element(s), and application-specific integrated circuit (ASIC) element(s). Any instruction set architecture may be used in processor 902 including but not limited to reduced instruction set computer (RISC) architecture and/or complex instruction set computer (CISC) architecture. A module (processing module) 914 is shown on mass storage 908, but as will be obvious to one skilled in the art, could be located on any of the memory devices.

Mass storage device 908 is a non-limiting example of a non-transitory computer-readable storage medium bearing computer-readable code for implementing the mapping, tracking, positioning, and navigating methodology described herein. Other examples of such computer-readable storage media include read-only memories such as CDs bearing such code.

System 900 may have an operating system stored on the memory devices, the ROM may include boot code for the system, and the processor may be configured for executing the boot code to load the operating system to RAM 904, executing the operating system to copy computer-readable code to RAM 904 and execute the code.

Network connection 620 provides communications to and from system 900. Typically, a single network connection provides one or more links, including virtual connections, to other devices on local and/or remote networks. Alternatively, system 900 can include more than one network connection (not shown), each network connection providing one or more links to other devices and/or networks.

System 900 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present inventions as defined in the appended claims.

What is claimed is:

1. A method for mapping, comprising the steps of
   (a) receiving sensor data based on location and a path of movement of a mobile device;
   (b) generating, based on said sensor data, a path estimate and a location measurement vector (LMV),
      (i) said path estimate including locations of the movement of the mobile device; and
      (ii) said location measurement vector including one or more measurements at each of said locations from the sensor data from each of said locations; and
   (c) generating, based on said sensor data, said path estimate, and said location measurement vector, one or more unique path features (UPFs),
      (i) said UPFs characterizing said path,
      (ii) said UPFs generated by performing an operation based on said path estimate and said location measurement vector, and
      (iii) said operation over said path of movement.

2. The method of claim 1 wherein said path estimate includes one or more measurements selected from the group consisting of: (a) location uncertainty of said path estimate; and (b) global axis framework orientation estimate aligning said mobile device to a common axis framework used by one or more other mobile devices.

3. The method of claim 1 wherein said location measurement vector includes one or more measurements selected from the group consisting of:
   (a) magnetic field measurements;
   (b) calibrated magnetic field measurements;
   (c) radio signal strength indicator (RSSI) measurements from at least one or more of Wi-Fi, Bluetooth low energy (BLE), cellular base station, or other radio frequency (RF) beacons;
   (d) path loss (PL) measurements from at least one or more of Wi-Fi, BLE, cellular base station, or other RF beacons; and (e) time difference of arrival (TDOA) measurements from at least one or more Wi-Fi, BLE, cellular base station, or other RF beacons.

4. The method of claim 1 wherein said location measurement vector is a location measurement change vector wherein each group of one or more measurements in said location measurement change vector is based on a change from a first of said locations to another of said locations.

5. The method of claim 4 wherein generating said UPFs includes performing an operation based on said location measurement vector and said location measurement change vector.

6. The method of claim 1 wherein said operation is an orientation invariant function, independent of the orientation of the mobile device.

7. The method of claim 1 wherein said operation is one or more techniques selected from the group consisting of:
(a) a dot product between said location measurement vector and measurement changes;
(b) autocorrelation;
(c) cross-correlation;
(d) a path integral over said path estimate;
(e) autocorrelation between said location measurement vector and measurement changes over said path estimate;
(f) a path integral of magnetic measurements over said location measurement vector;
(g) a path integral of magnetic measurements over path change estimation (velocity);
(h) a path integral of magnetic measurements over magnetic measurements changes;
(i) a function of radio signal strength indicator (RSSI);
(j) a function of RSSI over said location measurement vector;
(k) a path integral of RSSI measurements over RSSI measurement changes;
(l) a function of path loss over said location measurement vector;
(m) a path integral of path loss (PL) measurements over PL measurements changes;
(n) a function of time difference of arrival (TDOA) over said location measurement vector; and
(o) a path integral of TDOA over TDOA measurements changes.

8. The method of claim 1 further including the step of: calculating, based on said UPFs, one or more lanes along which said mobile device has moved.

9. The method of claim 8 further including calculating lane estimates and convergence weights for combining lane estimates derived from the estimates uncertainty measures.

10. The method of claim 8 further including a step of: determining junctions based on said lanes.

11. The method of claim 8 wherein compared sections are over a path length corresponding a distance between 3 and 15 meters.

12. The method of claim 8 further including a step of: generating a pedestrian lane map based on said lanes, said pedestrian lane map including UPFs and associated lanes.

13. The method of claim 12 wherein said pedestrian lane map further includes an additional layer of information associated with said locations and said lanes.

14. The method of claim 12 further including a step of: removing one or more of said lanes and/or junctions from said pedestrian lane map.

15. The method of claim 1 further including a step of calculating one or more lane estimates based on said UPFs, and then calculating a convergence of said lane estimates into one or more lanes.

16. The method of claim 15 wherein feedback is used to update said one or more lane estimates.

17. The method of claim 1 wherein a plurality of UPFs are respectively generated for a corresponding plurality of mobile devices.

18. The method of claim 17 wherein a plurality of lanes are-is calculated based on correlating said plurality of UPFs.

19. The method of claim 1 wherein a plurality of UPFs are crowd-sourced from a corresponding plurality of mobile devices.

20. The method of claim 1 further including the step of: generating a reverse path based on reversing the sensor data.

21. A non-transitory computer-readable storage medium having embedded thereon computer-readable code for mapping, the computer-readable code comprising program code for:
(a) receiving sensor data based on location and a path of movement of a mobile device;
(b) generating, based on said sensor data, a path estimate and a location measurement vector,
(i) said path estimate including locations of the movement of the mobile device; and
(ii) said location measurement vector including one or more measurements at each of said locations from the sensor data from each of said locations; and
(c) generating, based on said sensor data, said path estimate, and said location measurement vector, one or more unique path features (UPFs),
(i) said UPFs characterizing said path,
(ii) said UPFs generated by performing an operation based on said path estimate and said location measurement vector, and
(iii) said operation over said path of movement.

22. The method of claim 1 further including the step of:
(d) comparing said generated UPFs to stored UPFs in a pedestrian lane map to determine matching UPFs.

23. The method of claim 22 wherein said path estimate includes one or more measurements selected from the group consisting of:
(a) location uncertainty of said path estimate; and
(b) global axis framework orientation estimate aligning said mobile device to a common axis framework used by one or more other mobile devices.

24. The method of claim 22 wherein said matching UPFs have lanes.

25. The method of claim 24 further including the step of: calculating, based on said sensor data and said lanes, a location on one of said lanes of the mobile device.

26. The method of claim 22 wherein said matching UPFs are used to improve subsequent generation of path estimates and location measurement vectors.

27. The method of claim 22 wherein said operation is an orientation invariant function, independent of the orientation of the mobile device.

28. The method of claim 22 wherein said comparing is over a path length corresponding the most recent 3 to 15 meters of said movement of said mobile device.

29. The method of claim 22 wherein said path estimate includes a location uncertainty measure of said path estimate and further including deriving a search bound from said location uncertainty measure.

30. The method of claim 22 including one or more functions selected from the group consisting of:

(a) finding a route on said pedestrian lane map from a first location selected from the group consisting of:
  (i) a current location of the mobile device; and
  (ii) a location on said pedestrian lane map, to a second location selected from the group consisting of:
  (iii) a location of a device other than the mobile device; and
  (iv) a location on said pedestrian lane map; and prepare features of said route for real-time tracking;
(b) generating guiding instructions for navigation to a destination location based on said pedestrian lane map;
(c) tracking the mobile device during navigation;
(d) updating said pedestrian lane map based on user-supplied information;
(e) analyzing said pedestrian lane map to generate analytics on pedestrian traffic behavior;
(f) analyzing combinations of said location of the mobile device and user actions; and
(g) providing lanes from said matching UPFs to a map display.

31. The non-transitory computer-readable storage medium of claim 21 wherein said computer-readable code further includes program code for:
  (d) comparing said generated UPFs to stored UPFs in a pedestrian lane map to determine matching UPFs.

32. The method of claim 1 wherein:
  (a) a path length measure is generated based on said sensor data, and
  (b) said UPFs are generated on a path length corresponding to said path length measure.

33. The method of claim 32 wherein said path length measure is selected from the group consisting of
  (i) estimated distance traveled,
  (ii) estimated magnetic distance traveled, and
  (iii) estimated location measurement vector distance traveled.

* * * * *

UNITED STATES PATENT AND TRADEMARK OFFICE
CERTIFICATE OF CORRECTION

PATENT NO. : 10,584,972 B2
APPLICATION NO. : 15/757656
DATED : March 10, 2020
INVENTOR(S) : Amiram Frish It is certified that error appears in the above-identified patent and that said Letters Patent is hereby corrected as shown below:

In the Specification

Column 3, Line 25 should read:
According to the teachings of the present embodiment there is provided a method of positioning, Column 3, Line 26 should read:
, including the steps of receiving sensor data bawd based on location and movement, Column 5, Line 64 should read:
A lazy upload is typically from a mobile device Column 10, Line 47 should read:
, and various RF estimates such as RSSI, PL, TDOA and TOA Column 11, Line 21 should read:
two LMVs in a path taken by the mobile device.

Column 17, Line 6 should read:
the mobile device 116 as the navigation map local copy 112.

Column 19, Line 62 should read:
some initial GPS location or other means of side information Column 21, Line 26 should read:
to access RF measurements and sufficient infrastructure is recognized)

Column 21, Line 46 should read:
the pedestrian lane map (again for simplicity) Frmap an error Signed and Sealed this
Second Day of February, 2021

Drew Hirshfeld
*Performing the Functions and Duties of the*
*Under Secretary of Commerce for Intellectual Property and*
*Director of the United States Patent and Trademark Office*

Column 24, Line 17 should read:
errors, and/or the use of simplified calculations do not